Patented May 25, 1943

2,320,236

UNITED STATES PATENT OFFICE 2,320,236

POLISHING COMPOSITION

George F. Hogg, Chicago, Ill., assignor to Hercules Powder Company, Wilmington, Del., a corporation of Delaware No Drawing. Application November 13, 1940, Serial No. 365,464

6 Claims. (Cl. 106—230)

This invention relates to compositions of matter containing polymerized rosin and more particularly to polishing, sealing, protective coating, and depilatory or defeathering compositions containing polymerized rosin and wax.

It is an object of this invention to provide improved compositions of matter adapted for coating, polishing, finishing, sealing, luting, etc. Another object is to devise improved wax-containing compositions of the foregoing type. Another object is to devise improved wax-containing polishing compositions. Another object is to devise an improved sealing wax. Another object is to provide an improved depilatory wax. Still other objects will appear more fully hereinafter.

I have discovered that by the use of polymerized rosin in compositions of the above type as a partial replacement for or in addition to the more expensive waxes, improved compositions result. The increased melting point and decreased unsaturation of polymerized rosin as compared with ordinary rosin, impart advantageous properties, such as improved resistance to slipping which is an advantage in polishing and waxing compositions, and greater resistance to oxidation.

By modifying the wax components of known compositions with polymerized rosin in amounts such that the weight ratio of wax to polymerized rosin lies within the range of from about 100 to 1 to about 1 to 1, wax compositions of greatly improved properties result.

The invention is applicable generally to compositions containing wax as an important film-forming or binding constituent. Examples of waxes are carnauba, beeswax, ceresin, montan, japan, Chinese insect wax, paraffin, palm, ozokerite, candelilla, synthetic waxes, or mixtures thereof. Preferably, the film-forming or binding components consist essentially of a wax or mixture of waxes and not more than an equal weight of the polymerized rosin modifying agent.

Compositions consisting essentially of the wax and the polymerized rosin may be prepared. Alternatively, such compositions may be blended with a small or a large amount of a volatile organic solvent acting as a mutual solvent. Preferably, where a polish for coated surfaces is prepared, the solvent used is one capable of slightly softening the surface being polished. The weight ratio of solvent to the combined weights of wax and polymerized rosin may vary within wide limits depending upon the physical properties desired, for example, from about 100 to 1 to about 1 to 30. To produce a semi-solid or solid polishing composition wherein the principal or only vehicle is the solvent, it is preferred to employ a ratio within the range of from about 3 to 1 to about 1 to 2. For a sealing or luting wax, the amount of mutual solvent may advantageously be less than 10% by weight based on the total weight of the composition consisting essentially of a wax or waxes and polymerized rosin and the solvent.

The compositions, either with or without a mutual solvent may be emulsified in water, or may have water emulsified therein to further modify their physical characteristics or increase their ease and effectiveness in use. Water-soluble soaps of polymerized rosin may advantageously be used for preparation of oil-in-water type emulsions, resulting in emulsions of greater body and viscosity, better resistance to oxidation, ageing, and greater stability. The aqueous phase of oil-in-water type emulsion polishes may advantageously constitute about 75% or more by weight of the emulsion. The combination of the triethanolamine soap of polymerized rosin and an ammonia soap of shellac has been found to be a particularly good emulsifying agent for such an emulsion. The water-insoluble soaps of polymerized rosin may likewise be used as the emulsifying agent in water-in-oil type emulsions, with corresponding advantages. Paste-like water-in-oil emulsions may advantageously contain in the continuous phase a mutual solvent of the type referred to above which solvent is water-immiscible, and preferably contain the aqueous phase in amount less than about 50% by weight of the emulsion.

In the paper and cardboard field a large volume of waxes, principally paraffin, is used as a coating. Frequently, a small percentage of rosin is mixed with the wax to improve the gloss and hardness of the coating. Such mixtures are unsatisfactory because of crystallizing tendency, insufficient gloss or hardness, etc. I have discovered that polymerized rosin shows much less tendency to crystallize when used in small percentages with waxes in this field, and gives a better gloss and superior hardness because of its higher melting point. Paper coated with wax containing from about 1% to about 10% by weight of polymerized rosin based on the weight of wax exhibits markedly superior properties. If desired, such mixtures consisting essentially of wax and polymerized rosin may be emulsified in water and applied in this form to the surface of the paper or cardboard or the like. Waxed papers so prepared as to be heat-sealing display superior properties and an especially strong bond when heat-sealed.

Suitable amounts of pigments, fillers, dyes, plasticizers, and other organic materials such as resins, oils, etc. may be incorporated with the modified wax compositions to render them more advantageous in certain uses.

The wax compositions of the present invention may be used, as, or in, shoe-thread waxes, paper coating compositions, hot melt adhesives, fowl defeathering compositions, dehairing compositions, textile finishing, linoleum wax, floor polish, automobile polish, shoe polish, furniture polish, and generally in the plastic and coating field particularly where it is desired to deposit a thin film of wax upon a surface.

Depilatory (dehairing and defeathering) compositions prepared with polymerized rosin show better congealing properties, greater hardness, and freedom from crystallization and deterioration heretofore attendant upon the use of ordinary rosin which crystallizes, separates out of the molten depilatory, and oxidizes.

Sealing waxes may be prepared which comprise principally a wax modified with a substantial proportion of polymerized rosin. These compositions are particularly suitable for sealing and luting. True sealing wax in hard stick form adapted to be melted by heat, to be impressed with a seal, and to adhere to paper or the like upon solidification may be prepared with polymerized rosin. In addition to polymerized rosin, it is desirable to include in such true sealing waxes other ingredients which are commonly used in sealing wax such as Venice turpentine, shellac, and pigments or fillers, the latter preferably being used in minor proportion, say less than 25% by weight of the total composition. Polymerized rosin may advantageously replace a part or all of the shellac commonly employed in conjunction with Venice turpentine and pigments to produce a true sealing wax.

Methods of polymerizing rosin are well known to the art and need not be described in detail here. A typical method is that set forth in U. S. Patent No. 2,017,866. In general, polymerized rosin may be said to be characterized by a melting point increase above ordinary rosin of from about 5° C. to about 100° C., a considerably increased molecular weight over ordinary rosin, substantial freedom from hardening substances held in combination, an acid number varying from that of the original rosin down to say about 100, and an iodine value materially lower than ordinary rosin. The rosin may be polymerized by means of metal halides, mineral acids, etc. and the polymerized rosin, regardless of the method of polymerization, may be further refined in any desired manner as for example by means of selective solvents such as furfural, etc., selective adsorbents such as fuller's earth, activated carbon etc. It is preferred to employ polymerized rosin having a melting point of at least about 95° C. ranging upwardly to about 170° C., the melting point of the pure dimer.

Below are given several specific examples of compositions prepared in accordance with the principles of the present invention. The polymerized rosin used in these examples was wood rosin polymerized to a melting point (drop) of 98–100° C. and had an acid number of 151–155.

Example 1

| | Parts by weight |
|---|---|
| Carnauba wax | 39.6 |
| Polymerized rosin | 14.7 |
| Triethanolamine | 8.8 |
| Borax | 4.0 |
| Shellac | 8.8 |
| 28% ammonia | 1.2 |
| Water | 406.0 |

The carnauba wax and the polymerized rosin were melted together and stirred at 110–120° C. whereupon the triethanolamine was added with stirring until a clear solution resulted. The borax dissolved in 10 parts of the water which had been heated to boiling, was added to the resulting mixture and the whole stirred until smooth. 332 parts of the water was then added. A separate solution composed of 64 parts of the water, the shellac, and the ammonia was prepared and added to the mixture with vigorous stirring. An emulsion of the oil-in-water type having excellent polishing properties resulted. The product was particularly useful as a floor polish.

Example 2

| | Parts by weight |
|---|---|
| Carnauba wax | 9 |
| Beeswax | 4 |
| Ceresin | 8 |
| Polymerized rosin | 13 |
| Naphtha (high flash) | 150 |
| Stearic acid | 14 |
| Triethanolamine | 5.4 |
| Bentonite | 50 |
| Water | 150 |

The stearic acid, water, and triethanolamine were stirred together at 60° C. until a smooth soap resulted. Meanwhile the waxes and the resin were melted together and the naphtha added to give a homogeneous solution. This hot solution was added slowly to the hot solution of triethanolamine stearate with vigorous agitation whereupon the mixture was allowed to cool. When the temperature was approximately 40° C., the bentonite was added with stirring. A smooth paste emulsion of the water-in-oil type resulted which was an excellent polish for dull painted surfaces. The product was especially suitable for use as an automobile polish.

Example 3

| | Parts by weight |
|---|---|
| Montan wax | 15 |
| Ceresin | 45 |
| Beeswax | 20 |
| Polymerized rosin | 20 |
| Turpentine | 200 |
| Nigrosin (oil soluble) | 8 |

The waxes, the dye, and the polymerized rosin were melted together with stirring whereupon the turpentine was added with stirring. A soft paste resulted which was an excellent shoe polish.

Example 4

| | Parts by weight |
|---|---|
| Beeswax | 20 |
| Carnauba wax | 90 |
| Paraffin (melting point 125° F.) | 160 |
| Polymerized rosin | 30 |
| "Varsol" (petroleum hydrocarbon turpentine substitute) | 200 |

The waxes and the resin were melted together with stirring whereupon the solvent was added. Upon cooling, a light tan, waxy solid resulted. Upon application to a linoleum surface, a high polish resulted. This composition was particularly suitable for hot factory application to manufactured linoleum.

Example 5

| | Parts by weight |
|---|---|
| Ceresin | 20 |
| Paraffin (melting point 125° F.) | 20 |
| Japan wax | 40 |
| Beeswax | 120 |
| N wood rosin | 20 |
| Polymerized rosin | 20 |
| Turpentine | 8 |

These ingredients were melted together with stirring and cast into molds. The resulting product was a tan hard waxy material having sealing properties. It was particularly adapted to be applied hot for sealing joints, cracks and the like.

Example 6

| | Parts by weight |
|---|---|
| Shellac | 10 |
| Polymerized rosin | 14 |
| Venice turpentine | 13 |
| Precipitated calcium carbonate | 4 |
| Vermilion | 4 |

The shellac and polymerized rosin were melted together at 110° C. whereupon the previously mixed calcium carbonate and vermilion were added with stirring. Thereupon the Venice turpentine was added with stirring and the hot mixture was cast into sticks of sealing wax which were particularly adapted to be melted as by the heat of a flame, applied to paper, impressed with an embossing seal while still hot and when solidified to retain the imprint and adhere firmly to the surface of the paper. The product displayed improved characteristics and was considerably less expensive to manufacture than conventional sealing wax.

Example 7

| | Parts by weight |
|---|---|
| Paraffin wax (M. P. 125° F.) | 95 |
| Polymerized rosin | 5 |

These ingredients were melted together with stirring and allowed to cool. The resulting composition was melted and employed as a fowl defeathering composition.

Example 8

| | Parts by weight |
|---|---|
| Polymerized rosin | 50 |
| Paraffin wax (M. P. 125° F.) | 50 |

These ingredients were commingled and melted to form a homogeneous mixture. The product was an excellent depilatory or defeathering composition.

From the foregoing, it will be seen that the use of polymerized rosin in accordance with the principles of the present invention brings about improved results in the plastic and coating composition fields. Use of polymerized rosin overcomes the objectionable tendency of ordinary rosin to crystallize in compositions made therewith. In addition, the products manufactured in accordance with the present invention are less expensive by reason of the use of polymerized rosin in place of more expensive ingredients such as wax or shellac and display improved properties.

It will be understood that the details and examples hereinbefore set forth are illustrative only and that the invention as broadly described and claimed is in no way limited thereby.

What I claim and desire to protect by Letters Patent is:

1. A polishing composition wherein the film-forming or binding components consist essentially of polymerized rosin and wax in amounts such that the ratio of wax to polymerized rosin lies within the range of from about 100 to 1 to about 1 to 1.

2. A polishing composition consisting essentially of polymerized rosin, wax, and a mutual volatile organic solvent for said polymerized rosin and said wax, the proportions of said ingredients being such that the ratio of wax to polymerized rosin lies within the range of from about 100 to 1 to about 1 to 1 and the ratio of said solvent to the combined weight of said polymerized rosin and said wax lies within the range of from about 3 to 1 to about 1 to 2.

3. A polishing composition comprising a dilute oil-in-water type emulsion wherein the film-forming constituents of the dispersed phase consist essentially of polymerized rosin and wax in amounts such that the ratio of wax to polymerized rosin lies within the range of from about 100 to 1 to about 1 to 1, and wherein the emulsifying agent comprises the triethanolamine soap of polymerized rosin and the ammonia soap of shellac, the aqueous phase of said emulsion constituting at least about 75% by weight based on the weight of the emulsion.

4. A polishing composition comprising a water-in-oil type emulsion of paste-like consistency wherein the film-forming components of the continuous phase consist essentially of polymerized rosin and wax in amounts such that the ratio of wax to polymerized rosin lies within the range of from about 100 to 1 to about 1 to 1, and a mutual volatile organic solvent for said film-forming constituents, said solvent being water-insoluble, the aqueous phase of said emulsion constituting less than about 50% by weight of the emulsion.

5. A polishing composition comprising an oil-in-water type emulsion comprising a disperse phase comprising water and an emulsifying agent and a dispersed phase consisting essentially of a polymerized rosin and a wax in amounts such that the ratio of wax to polymerized rosin lies within the range of from about 100 to 1 to about 1 to 1.

6. A polishing composition comprising a water-in-oil type emulsion comprising a dispersed phase comprising water and an emulsifying agent and a disperse phase consisting essentially of a polymerized rosin and a wax in amounts such that the ratio of wax to polymerized rosin lies within the range of from about 100 to 1 to about 1 to 1.

GEORGE F. HOGG.